G. E. HARDESTY.
FARM GATE.
APPLICATION FILED MAR. 28, 1916.
1,210,797.
Patented Jan. 2, 1917.
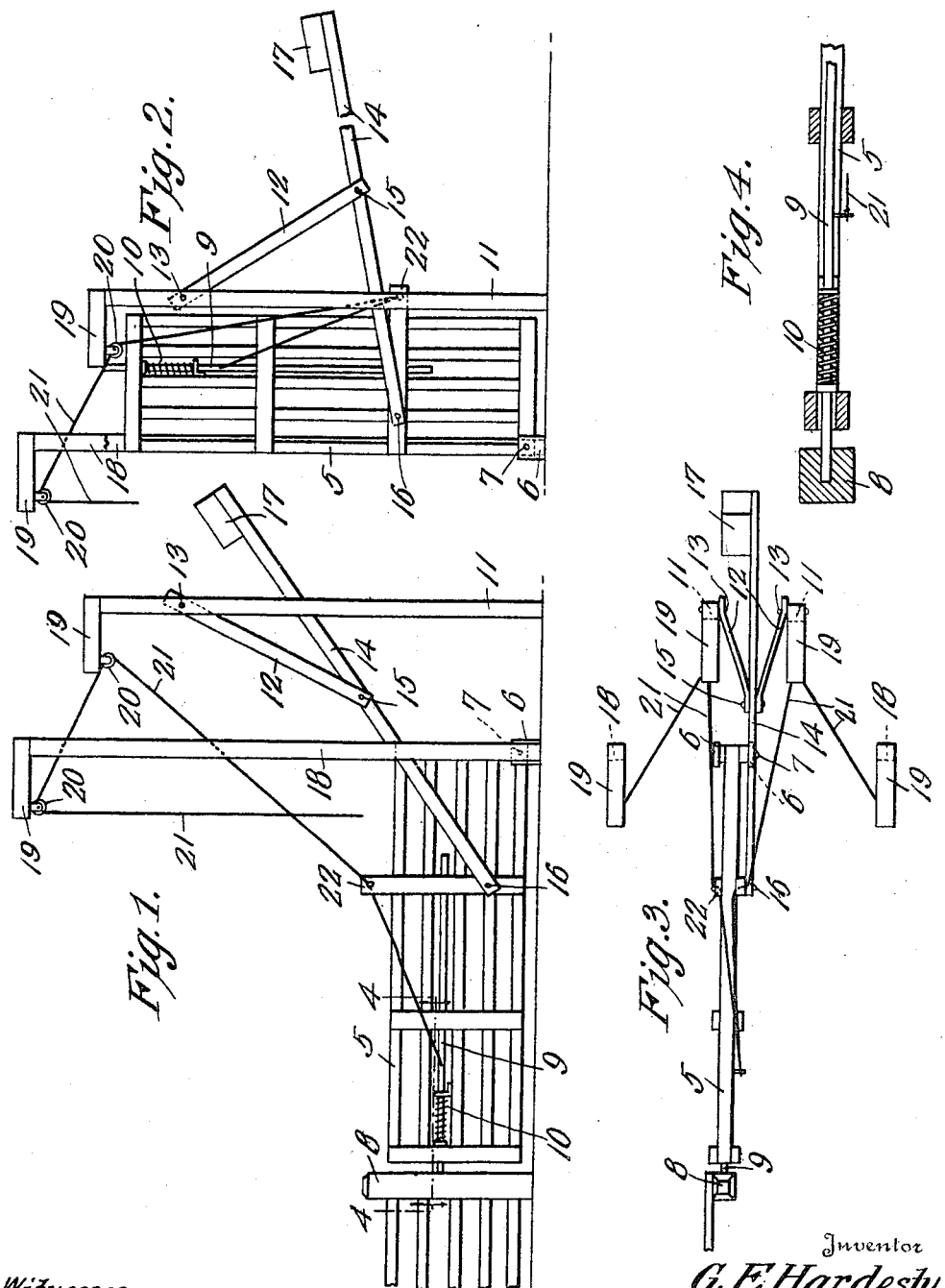
Witnesses
James F. Crown
Inventor
G. E. Hardesty,
By
Attorneys

UNITED STATES PATENT OFFICE.

GEORGE E. HARDESTY, OF FOLSOM, NEW MEXICO.

FARM-GATE.

1,210,797.

Specification of Letters Patent.

Patented Jan. 2, 1917.

Application filed March 28, 1916. Serial No. 87,296.

*To all whom it may concern:*

Be it known that I, GEORGE E. HARDESTY, a citizen of the United States, residing at Folsom, in the county of Union, State of New Mexico, have invented certain new and useful Improvements in Farm-Gates; and I do hereby declare the following to be a full, clear, and exact description of the invention, such as will enable others skilled in the art to which it appertains to make and use the same.

This invention relates to tilting gates, and aims primarily to provide a gate of this type requiring but small amount of exertion to impart to the gate initial tilting movement, and further characterized by improved means for arresting the movement of the gate as the latter nears the extreme tilting movement of the same to prevent violent shocks to the gate as the latter contacts with the ground, either in closing or opening position.

A further object of the invention is to provide a gate of this character which is of comparatively simple and inexpensive construction, which may be easily and quickly installed, which is so arranged and constructed as to preclude the possibility of breakage or derangement of the same, and which will prove thoroughly efficient in the attainment of the ends for which it is designed.

With these objects in view, together with others which will appear as the description proceeds, the invention resides in the novel combination and arrangement of parts, all as will be described more fully hereinafter, illustrated in the drawings and particularly pointed out in the claim.

The invention will be best understood by reference to the accompanying drawings, wherein:

Figure 1, is a side elevation of a gate constructed in accordance with my invention, the same being shown in closed position, Fig. 2, is a view similar to Fig. 1 and illustrating the gate swung to open position, Fig. 3, is a plan view of the device shown in Fig. 1, and Fig. 4, is a sectional view taken on line 4—4 of Fig. 1.

Referring now more particularly to the drawings, the gate is indicated at 5. This gate is pivoted between posts 6 at its rear end and at the lower edge thereof, and is adapted when swung to open position to rock upon the pivot 7 to rest upon its rear edge in vertical position. A post 8 is positioned adjacent the forward end of the gate, and a locking pin 9 is arranged for sliding movement upon the gate and is adapted to coöperate with a suitable keeper upon the post to prevent lateral movement of the gate when in closed position. A coil spring 10 may be arranged upon the locking pin 9 to normally maintain the latter in forwardly projecting or locking position.

Erected in the rear of the gate are posts 11. These posts are arranged one upon each side of a line projecting parallel with the rails of the gate rearwardly of the latter, and rock arms 12 are pivoted at one end as at 13 to the said opposite posts 11 upon the adjacent faces of the latter and above the uppermost edge of the gate. The arms 12 project from their point of connection with the posts 11 downwardly between the said posts to meet at their extremities above the uppermost edge of the gate when closed. A lever 14 is pivoted intermediate its ends as at 15 between the arm ends 12, the forward end of the lever being pivotally connected as at 16 with the gate adjacent the lowermost rail thereof and inwardly from the pivotal connection with the posts 6. The opposite or free end of the lever 14 is weighted as at 17. Posts 18 are erected upon the opposite sides of the gate considerably in advance and in arrears thereof, the said posts being preferably alined with the pivoted end of the said gate. Forwardly projecting extensions 19 are arranged upon the posts 11 and 18, to the lowermost face of each of which is connected a pulley 20, and through which gate opening wires or cords 21 pass. One end of each of the cords is connected to the latch bar 9 of the gate, passing therefrom through a suitable keeper 22 upon the gate and through the pulleys 20 upon the extensions 19 of the posts 11 and 18, to depend at its free end from the last mentioned post within convenient reach of persons approaching the gate from either direction. Upon a pull being applied to either of the depending cords, the latch bar 9 will be withdrawn against the tension of the spring 10 from engagement with the post keeper 8. Additional pull upon the cord will cause the gate 5 to rock upon its pivot 7. This slight initial movement is all that is necessary to be given to the gate, as the weight 17 upon the lever 14 will instantly operate to rock the gate to the limit of its opening position, it being understood of course, that the weight 17 is of sufficient size to create the necessary rocking movement upon the gate after the latter has been initially moved.

It will be observed that when the gate is in closed position, the arms 12 project forwardly from their pivotal connection with the posts 11, and as the gate swings to an upwardly tilting or open position, the said arms will rock upon their pivots to rearward position, whereupon they extend rearwardly of their supporting positions. As the arms thus swing, the pivot 15 of the lever describes an arc, the lowermost point of the arc being at that point where the free ends of the arms 12 pass the posts 11. As the gate thus swings to upward tilting position, the weight of the arms 12, lever 14 and the weight 17 will rock the said gate until the free ends of the arms 12 pass beyond the lowermost point of the arc, whereupon the weight will act to retard or check the rearward tilting movement of the gate and allow the same to rest easily and without jar upon the ground in vertical position. Pull upon either of the cords will then reverse the action of the gate and the latter will be allowed to swing downwardly and to rest easily without shock upon the ground in closed position. It is thus seen that a simple and efficient mechanism is provided for opening and closing the gate and for retarding the violent swinging movements thereof automatically to insure the gate against violent shocks or jars which would tend to break or disable the same.

While I have herein shown and described a particular or preferred embodiment of the invention, I wish it to be understood that I need not confine myself to all the precise details of construction herein set forth by way of illustrating as modification and variation may be made without departing from the spirit of the invention or exceeding the scope of the claim.

What is claimed is:

The combination with a gate pivoted at its rear lower corner to swing into vertical position, a lever pivotally connected at one end to the lower portion of the gate and extending upwardly and rearwardly therefrom, a link suspended from an overhead point and pivotally connected to an intermediate point on said lever, to provide a pivot for the latter which swings in an arc rearwardly from said gate, a counterbalance on the free end of said lever, and means to initially lift the gate.

In testimony whereof, I affix my signature, in the presence of two witnesses.

GEORGE E. HARDESTY.

Witnesses:
J. A. DOHERTY,
L. F. GOMEZ.

Copies of this patent may be obtained for five cents each, by addressing the "Commissioner of Patents. Washington, D. C."